United States Patent [19]

Lohr, Jr. et al.

[11] 3,883,457

[45] May 13, 1975

[54] STABILIZED POLYBUTADIENE RESIN

[75] Inventors: Delmar F. Lohr, Jr.; Edward Leo Kay, both of Akron, Ohio

[73] Assignee: The Firestone Tire & Rubber Company, Akron, Ohio

[22] Filed: Apr. 16, 1973

[21] Appl. No.: 351,688

[52] U.S. Cl.............. 260/23.7 R; 260/23.7 M; 260/45.75 W; 260/45.9 NP
[51] Int. Cl............................................. C08d 11/04
[58] Field of Search... 260/23.7 R, 23.7 M, 45.9 NP

[56] References Cited
UNITED STATES PATENTS

| | | | |
|---|---|---|---|
| 2,906,731 | 9/1959 | Hill et al. | 260/45.75 R |
| 3,083,175 | 3/1963 | Safford et al. | 260/45.9 R |
| 3,124,556 | 3/1964 | Merrifield et al. | 260/23.7 M |
| 3,386,937 | 6/1968 | Amberg | 260/23.7 M |
| 3,494,900 | 2/1970 | Marita et al. | 260/23.7 M |
| 3,496,152 | 2/1970 | Marita et al. | 260/23.7 M |
| 3,658,637 | 4/1972 | Danielson | 260/23.7 M |

FOREIGN PATENTS OR APPLICATIONS

| | | | |
|---|---|---|---|
| 1,227,162 | 4/1971 | United Kingdom | 260/23.7 R |

*Primary Examiner*—V. P. Hoke

[57] ABSTRACT

The incorporation of substituted ammonium salts of a dihydrocarbylphosphorodithioic acid into a polybutadiene resin greatly enhances the resistance thereof to thermo-oxidative deterioration.

8 Claims, No Drawings

STABILIZED POLYBUTADIENE RESIN

FIELD OF THE INVENTION

This invention relates to butadiene polymer and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1,2- configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

|  | Parts by Weight |
|---|---|
| Polybutadiene or copolymer resin | 100 |
| A substituted ammonium salt of a dialkylphosphorodithioic acid | 0.5–5.0 |
| A metal soap | 0.5–5.0 | the composition being cured by heating with presence of:

A peroxide curing agent 0.5–6.0

The above ingredients are, of course, exclusive of other filling, reinforcing and compounding ingredients such as glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60 percent, based on the copolymers, of styrene. Also minor proportions, say up to 15 percent based on the copolymer of other ethylenically unsaturated compounds may be incorporated in the copolymers. These resins are usually prepared by (co) polymerizing the monomers by means of free radical or anionic catalysts to a relatively low molecular weight, said 1000–200,000, so that they are of at least a flowable consistence. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40 percent, and preferably at least 60 percent by weight, of butadiene in the polymer molecule, and having at least 80 percent by weight of the butadiene therein the vinyl type of butadiene repeating unit structure. The average molecular weight (determined by intrinsic viscosity measurement) is at least 12,500 and the molecular weight distribution is such that at least 50 percent, and preferably 90 percent, of the polymer has a molecular weight above 10,000 and at least 95 percent has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2- configuration, preferably at least 80 percent of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than 4 minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases, it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

The Substituted-Ammonium Salts of a Dialkylphosphorodithioic Acid

The substituted ammonium salts of a dialkylphosphorodithioic acid may be illustrated by the following general formula:

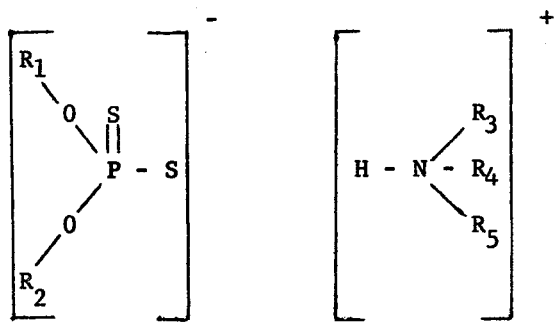

Formal charges on the ammonium ion (+) and dithiophosphate ion (−) were included to indicate that the products are salts. The actual degree of salt or ionic character will be a function of the "R" groups.

$R_1$ and $R_2$ are hydrocarbon groups containing from one to about sixteen carbon atoms. The hydrocarbon groups may be straight-chain or branched, cyclic or aromatic. Generally, $R_1$ and $R_2$ are the same; however, compounds in which $R_1$ and $R_2$ are not the same will function as antidegradants in our invention.

$R_3$, $R_4$ and $R_5$ may be hydrogen atoms or hydrocarbon groups containing from one to about sixteen carbon atoms. However, at least one of the groups must be a hydrocarbon group as herein defined. The ammonium salts of dialkylphosphorodithioic acids are generally too unstable for commercial use.

Alkyl amines are preferred to aromatic amines which generally form relatively unstable salts unless the aromatic amine has substituents which increase the basicity of the amine function.

If either $R_3$, $R_4$, or $R_5$ are hydrocarbon groups, the carbon atoms may be arranged as a straight chain, branched chain or cyclic.

The general preparation of the substituted ammonium salts o dialkylphosphorodithioic acids consists of reacting an alcohol or phenol corresponding to the $R_1$ and $R_2$ groups with phosphorous pentasulfide to form the dithioic acid. The acid is then reacted with an amine to form the substituted ammonium salt.

Immines such as hexamethyleneimine, guanidine or morpholine will also form salts useful in our invention with dialkylphosphorodithioic acids.

It will be obvious to one skilled in the art that many combinations of $R_1$, $R_2$, $R_3$, $R_4$, and $R_5$ are possible without departing from the scope of our invention.

Representative salts include mono, di or triethylammonium O,O -di-n-hexylphosphorodithioate, cyclohexylammonium O,O -di-2-ethylhexylphosphorodithioate, mono, di or triethylammonium O,O -di-isopropylphosphorodithioate, morpholinium O,O -di-2-ethylhexylphosphorodithioate, morpholinium O,O -di-n-octylphosphorodithioate, piperazinium O,O -di-2-ethylhexylphosphorodithioate, the tetra, penta, hexa or heptamethyleneimine salt of di-2-ethylhexylphosphorodithioate, mono, di or triethylammonium O,O -diphenylphosphorodithioate, cyclohexylammonium O,O -di-o, m or p-methylphenylphosphorodithioate, 1,3-diphenylguanidinium O,O -di-n-octylphosphorodithioate, 1,3-diphenylguanidinium O,O -di-2-ethylhexylphosphorodithioate, etc.

The cured resins produced in accordance with this invention have exceptional resistance to thermo-oxidative deterioration of physical properties, particularly modulus and flexural strength, upon long time exposure at high temperatures, i.e., temperatures above 400°F. and up to 700°F. Thus, the products, upon exposure to a temperature of 600°F. for 100 hours, will retain upwards of 80 percent of their modulus and upwards of 60 percent of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

| | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium stearate | (per Table I) |
| Substituted-ammonium O,O-dihydrocarbylphosphoro-dithioic acid | (per Table I) |

*90% of butadiene units in 1,2-configuration; molecular weight parameters $M_w$ = 29,000, $M_n$ = 23,000, DSV = 0.3

A series of compositions was made up in accordance with the above schedule, varying the calcium stearate and the ammonium salt in the several compositions as indicated in the table. In the case of each composition, all of the ingredients, in the proportions selected for that composition, were thoroughly mixed together, and the mixture poured into an evaporating dish to the depth of 0.5 inch. The dish was then placed in a vacuum oven, where the hexane was removed at 125°F. under a pressure of 1–5 mm. of mercury absolute. Each such dried composition was then removed and broken up, and molded in a compression mold into several test bars 1 inch × 3 inch × 0.1 inch. Temperature of molding was 350°F., total load on the die was 10–20 tons normal to the 1 inch × 3 inch face, and time was 4 minutes. The modulus and flexural strength was determined upon control bars from each composition, and the average recorded in the table.

The incorporation of hexane in the mix was a matter of convenience for preparing relatively small samples in the laboratory. On an industrial scale, the components of the mixture could be mixed without hexane solvent as a matter of economics.

TABLE I

STABILIZING EFFECTS OF SUBSTITUTED AMMONIUM SALTS OF O,O-DI-HYDROCARBYLPHOSPHORODITHIOIC ACIDS

| Test Sample | Flexural Modulus, psi ×10⁻⁶ | | | Flexural Strength, psi | | |
|---|---|---|---|---|---|---|
| | Unaged | Aged | % Retained | Unaged | Aged | % Retained |
| 1. Control, no stabilizer | 1.31 | 0.12 | 9 | 11,100 | 1,100 | 10 |
| 2. Control plus Ca Stearate, 3.0 phr | 1.40 | 1.11 | 79 | 10,700 | 7,200 | 67 |
| 3. Sample No.2 plus phr of stabilizer: | | | | | | |
| A, 1.0 | 1.40 | 1.34 | 96 | 11,000 | 9,100 | 83 |
| A, 2.0 | 1.29 | 1.42 | 110 | 11,800 | 9,700 | 82 |
| B, 2.0 | 1.43 | 1.26 | 88 | 9,400 | 8,900 | 95 |
| C, 2.0 | 1.40 | 1.34 | 96 | 11,900 | 9,800 | 82 |

Stabilizer A is triethylammonium O,O-di-n-hexylphosphorodithioate.
Stabilizer B is 1,3-diphenylguanidinium O,O-di-n-octylphosphorodithioate.
Stabilizer C is morpholinium O,O-di-n-octylphosphorodithioate.

As shown by the data summarized in Table I, all of the substituted ammonium salts of the O,O-di-hydrocarbylphosphorodithioic acids significantly improved both the flexural modulus and strength retentions after aging of the test specimens relative to the controls.

To illustrate the effectiveness of substituted ammonium salts of O,O-di-hydrocarbylphosphorodithioic acids as stabilizers against thermoxidative degradation, we included a control specimen (Test Sample 1) which did not contain a stabilizer. We also included a control containing 3.0 l phr of calcium stearate (Test Sample 2) because we have also determined that calcium stearate has a stabilizing effect. Without exception, the ammonium O,O-di-hydrocarbylphosphorodithioates effected a higher percent retention of both flexural modulus and strength than the controls.

Specifically, Stabilizer A which is triethylammonium O,O-di-n-hexylphosphorodithioate at a 1.0 phr level gave a flexural modulus retention of 96 percent and flexural strength retention of 83 percent. At a 2.0 phr level, the flexural modulus actually was higher on the aged sample than the modulus value obtained on the original unaged sample.

Similar beneficial results were obtained with Stabilizer B which is 1,3-diphenylguanidinium O,O-di-n-octylphosphorodithioate and Stabilizer C which is morpholinium O,O-di-n-octylphosphorodithioate.

What is claimed is:

1. A composition curable to a hard resin having enhanced resistance to thermo-oxidative deterioration of its mechanical properties, which composition comprises

| | Parts by Weight |
|---|---|
| A butadiene polymer or copolymer resin | 100 |
| Vinyltriacetoxysilane | 0.05–5.0 |
| Silica | 100–500 |
| A substituted ammonium dihydrocarbylphosphorodithioate | 0.5–5.0 |
| Calcium stearate | 0.5–5.0 |
| Dicumyl peroxide | 0.5–6.0 | the resin being a homopolymer of butadiene or a copolymer of butadiene and styrene and containing at least 40 percent by weight of butadiene, and at least 80 percent of butadiene repeating units in the 1,2-configuration, and having a molecular weight of 12,500 to 55,000.

2. Composition of claim 1, wherein the substituted ammonium dihydrocarbylphosphorodithioate is triethylammonium O,O-di-n-hexylphosphorodithioate.

3. Composition of claim 1, wherein the substituted ammonium dihydrocarbylphosphorodithioate is 1,3-diphenylguanidinium O,O-di-n-octylphosphorodithioate.

4. Composition of claim 1, wherein the substituted ammonium dihydrocarbylphosphorodithioate is morpholinium O,O-di-n-octylphosphorodithioate.

5. A peroxide-cured resin highly resistant to thermo-oxidative deterioration of physical properties, which polymer contains therein

| | Parts by Weight |
|---|---|
| A butadiene polymer or copolymer resin | 100 |
| Vinyltriacetoxysilane | 0.05–5.0 |
| Silica | 100–500 |
| A substituted ammonium dihydrocarbylphosphorodithioate | 0.5–5.0 |
| Calcium stearate | 0.5–5.0 | the resin being a homopolymer of butadiene or a copolymer of butadiene and styrene and containing at least 40 percent by weight of butadiene and having a molecular weight of 12,500 to 55,000, and at least 80 percent of butadiene repeating units in the homopolymer or copolymer being in the 1,2-configuration, said peroxide being one which in curing gave a radical of the structure $R_2(CH_3)CO\cdot$ where R represents a hydrocarbon radical of 1–20 carbon atoms.

6. The composition of claim 5, wherein the substituted ammonium dihydrocarbylphosphorodithioate is triethylammonium O,O -di-n-hexylphosphorodithioate.

7. The composition of claim 5, wherein the substituted ammonium dihydrocarbylphosphorodithioate is 1,3-diphenylguanidinium O,O -di-n-octylphosphorodithioate.

8. The composition of claim 5, wherein the substituted ammonium dihydrocarbylphosphorodithioate is morpholinium O,O -di-n-octylphosphorodithioate.

* * * * *